(12) United States Patent
Cogliandro (10) Patent No.: US 8,527,316 B2
(45) Date of Patent: Sep. 3, 2013

(54) SYSTEM AND METHOD FOR RISK ADJUSTED STRATEGIC PLANNING AND PHASED DECISION MANAGEMENT

(76) Inventor: John Cogliandro, Dedham, MA (US)

( * ) Notice: Subject to any disclaimer, the term of this patent is extended or adjusted under 35 U.S.C. 154(b) by 2622 days.

(21) Appl. No.: 10/113,490

(22) Filed: Apr. 1, 2002

(65) Prior Publication Data
US 2004/0015375 A1 Jan. 22, 2004

Related U.S. Application Data

(60) Provisional application No. 60/280,131, filed on Apr. 2, 2001.

(51) Int. Cl.
*G06Q 10/06* (2012.01)
(52) U.S. Cl.
USPC ............................................ 705/7.28; 706/47
(58) Field of Classification Search
USPC .................................. 705/1, 1.1, 7.28; 706/47
See application file for complete search history.

(56) References Cited

U.S. PATENT DOCUMENTS

| | | | | |
|---|---|---|---|---|
| 6,397,202 B1 * | 5/2002 | Higgins et al. | ................... | 706/47 |
| 2002/0059512 A1 * | 5/2002 | Desjardins | ........................ | 713/1 |

OTHER PUBLICATIONS

Block, Thomas, PMP, "The Seven Secrets of a Successful Project Office," PM Network 13, No. 4, 43-47, Apr. 1999.
Dorofee et al., "Continuous Risk Management Guidebook," Software Engineering Institute, Carnegie Mellon University 17-25, 1996.
Kostoff, "Identifying Research Program Technical Risk," Managers At Work, Research Technology Management 10-12, May-Jun. 1997.
Robinette et al., "An Integrated Approach to Risk Management and Risk Assessment," Government Electronic Industry Association Symposium, Wright Patterson AFB, 1-8, Sep. 25-29, 2000.
Schlechtweg et al., "Remember That Time Is Money!, How Can the Reduction of Time in the Product Development Process be Measured and Expressed in Financial Terms?," Technical Proceedings of the European Systems Engineering Conference (Munich, Germany) 2.7.1-347-2.7.1-354, Sep. 13, 2000.
Waddell et al, "CVNX Risk Management Plan," NNS Shipbuilding (for U.S. Navy under contract), Revision Nov. 19, 1999.
Cogliandro, John; "Innovation and Advanced Topics, Module 3, Fostering Innovation While Balancing Risk and Return," Dec. 2001; Strategic Balancing Mgmt. Consultants, 32 pages.
Cogliandro, John; "Strategic Risk Management and Effects on Innovation: The Three Dimensional Risk Method," Oct. 2000; 9 pages.
Cogliandro, John; "Strategic Balancing—Solving the Risk—Innovation Dilemma," Sep. 2001, 31 pages.
Cogliandro, J.A.; "Strategic Risk Management and the 3D Risk Management Method, Effects on Innovation," For EIA/GEIA 2000 Engineering and Technical Management Symposium; Sep. 2000; 13 pages.
Cogliandro, J.A.; "A Solution to the Risk Management/Innovation Dilemma," For INCOSE 2001, Melbourne, Australia, Jul. 2001, 16 pages.

\* cited by examiner

*Primary Examiner* — Heidi Kelley (57) ABSTRACT

The present invention relates to a system and method for reducing risk to a firm and firm program and, more particularly, to reducing risk and improving yield or performance by considering firm strategic intent, phase, and integrated visuals. The current invention identifies, quantifies, and integrates strategic intent into the risk mitigation procedure by modifying the consequence chart, by dividing the program into phases, and by depicting risk related metrics, including strategic intent, that are associated with the risk element, the program, and/or the firm in a three dimensional graph.

1 Claim, 10 Drawing Sheets

Figure 1

| Level | What is the Likelihood The Risk Will Happen? |
|---|---|
| a | Remote |
| b | Unlikely |
| c | Likely |
| d | Highly Likely |
| e | Near Certainty |

Likelihood Chart

Figure 2

| Level | What is the Magnitude of the Impact if the Risk is Realized? | | |
|---|---|---|---|
| | Schedule Factor | Cost Factor | Technical Performance Factor |
| 1 | Minimal to No Impact | Minimal to No Impact | Minimal to No Impact |
| 2 | Additional Resources Required; Able to Meet Need Dates | Less than 5% | Acceptable with Some Reduction in Margin |
| 3 | Minor Slip in Key Milestone Able to Meet Need Dates | 5% to 7% | Acceptable with Significant Reduction in Margin |
| 4 | Major Slip in Key Milestones or Critical Path Impacted | Greater than 7% to 10 % | Acceptable, No Remaining Margin |
| 5 | Cannot Achieve Key Team or Major Program Milestones | Greater than 10% | Unacceptable |

Consequence Chart

Figure 3

|   | 1 | 2 | 3 | 4 | 5 |
|---|---|---|---|---|---|
| e | Y | Y | R | R | R |
| d | G | Y | Y | R | R |
| c | G | Y | Y | R | R |
| b | G | G | G | Y | R |
| a | G | G | G | G | Y |

*Risk Item Likelihood Score* (y-axis)

*Risk Item Consequence Score* (x-axis)

Risk Assessment Guide

| Phase | Goal Component | Logical Return Component | Failure Definition | Consequence Factor Definition Modifier |
|---|---|---|---|---|
| Concept Exploration | Vision Driven, Strategic. Very long term return acceptable. | Long term. Is it a building block? y/n. | Risk is defined as projects that do not push the technical limits in the field. Failure is acceptable as long as it matches vision. Dollars and traditional success measures do not apply | Using Failure definition, construct related consequence definitions and chart. |
| Preliminary Design | Mission Driven, Tactical. All projects to be at mid-range or better in industry. | Should provide basis for next stage. Measurable contribution to vision and Mission. | Failure acceptable as long as it provides strong basis for next phase or next jump in technology of field of practice. All projects must match vision and mission, or be considered failed. Begin sifting non-relevant innovations out of portfolio.<br><br>Use Risk to reduce alternatives by corporate strategies. | Using Failure definition, construct related consequence definitions and chart.. |
| Final or Detailed Design | Operational, Profit/Loss. All projects to maintain 15% Net Present Value | Definite design solution, must meet projections | Traditional Risk view normally applies. Solid measurable performance required in all areas of cost, schedule and technical performance. Written plans required. Projects must have direct calculable returns matching corp ROI of 15%. All strategy metrics still apply. Rate any project that does not meet visionary goals as high risk. | Using Failure definition, construct related consequence definitions and chart.. |
| Construction and Delivery | Execution, Urgent Measured Performance | Very high yield, either time or performance. Cost not a factor in evaluation. | Smart innovation required, Risk tolerance very low. Make or break technologies/processes. Innovations are targeted, directly measured and weighed against delivery. Schedule risk tolerance is low while cost tolerance is high. | Using Failure definition, construct related consequence definitions and chart. |

Modification Chart for
Acme Cameral Company Example

Figure 7

| Magnitude Level | Technical Performance Consequence Factor | Schedule Consequence Factor | Cost Consequence Factor |
|---|---|---|---|
| 1 -- Marginal | Performance goals met, better than competitors but not much better. | No major impact to plans or goals | No major impact, still low-cost or near lowest cost producer |
| 2 -- Significant | Performance of 25% of planned improvement in jeopardy. | Slight slip, <2 months, re-plan marketing | Near lowest cost producer, margins <5% effected |
| 3 -- Serious | Performance goals in jeopardy, Should have 50% of planned improvement in performance, ahead of tier II competitors | Schedule in Jeopardy, but still ahead of tier II competitors | R&D Budget blown, Manufacturing costs still on target. Possible cost overrun 3-10% |
| 4 -- Very Serious | One new feature possible, otherwise same old stuff comparable to Tier II competitors | Schedule slip of 3 months on critical competitive features, product launch no longer synched with marketing | R&D Budget blown, Manufacturing costs over budget, could be high cost producer. Overrun of 10-20% |
| 5 -- Catastrophic | Falling behind tier II and Tier III competitors, same old stuff | Must retain old product package and marketing | High cost producer, cost overrun of > 20% |

**Modified Consequence Chart
for Acme Camera Company Example
For Preliminary Design Phase**

Figure 8

**Three Dimensional Risk Chart
With Metrics**

SYSTEM AND METHOD FOR RISK ADJUSTED STRATEGIC PLANNING AND PHASED DECISION MANAGEMENT

RELATED APPLICATIONS

This application claims the priority to and the benefit of U.S. Application Ser. No. 60/280,131 filed on Apr. 2, 2001, the contents of which are hereby incorporated by reference.

BACKGROUND OF THE INVENTION

1. Field of the Invention

The present invention relates to a system and method for reducing risk to a firm and a firm program and, more particularly, to reducing risk and improving yield or performance by considering firm strategic intent, program phase, and integrated visuals.

2. Description of the Related Art

Projects and programs of a firm or company (or any enterprise) involve many elements that must come together in an precise fashion in order to meet cost, time, and technical requirements. To assist in the management of these projects, both small and large, and simple and complex, conventional risk management methods are applied to the project to reduce or mitigate risk. In general, conventional risk management identifies project elements which pose the greatest risk to cost, schedule, and technical performance and then produces a plan to mitigate the risk. On a larger scale, traditional risk management is used by a firm to ensure that each program, as a whole, is a low, moderate, or high risk to the firm.

Traditional risk management methods, however, have many shortcomings and, often times, have the unintended result of increasing risk to the project and/or the firm. These adverse results are magnified by the complexity of a project.

Traditional risk management identifies elements in a particular project that are or are potentially a problem or a risk. An Element is a risk if there is any likelihood that the item will not perform as planned as it relates to cost, schedule, and/or technical performance. In other words, if there is a delta between the plan and what is believed will actually happen, then that element is considered a risk.

Once the risk element is identified the risk is graded or quantified, i.e., a risk score is produced. There are two grading factors used to quantify the risk associated with the risk element. The first grading factor is likelihood, which measures, by five levels, the likelihood or probability that the risk will happen. Likelihood level one is associated with the least likelihood and likelihood level five being associated with the most likelihood. The second grading factor is consequence, which measures, by levels, the magnitude of the impact of the risk, if realized, against cost, schedule, and technical performance. Cost, schedule and technical performance are referred to as consequence factors. Consequence level one is associated with the least impact and consequence level five is associated with the most impact. Each risk element will have three risk scores, representing combination of likelihood and consequence levels for cost, schedule and technical performance.

The three risk scores are each transferred into risk assessment values via an traditional risk management risk assessment guide and assigned a risk assessment rank. The transformation of risk scores to particular risk assessment rank is predefined by the risk assessment guide. Traditional risk assessment guides rank risk as high, moderate and low. The transformation is often achieved via a stop-light chart where each grid unit on the chart is predefined to correspond to either high, moderate or low risk rank.

Of the risk element's three risk ranks, only the highest risk rank, referred to as the primary driver, is selected for mitigation. The primary driver of each risk element is plotted on the stop-light chart. The program itself is given a program risk rating, based on the risk rank of a majority of plots and a mitigation plan is produced. The mitigation plan develops possible plans to reduce risk associated with each primary driver and may also address secondary drivers.

A weakness of traditional risk management is that the resulting risk assessment and mitigation plans are often times at odds with the firm or the project. For example, if a firm is designing a new camera, traditional risk management identifies that it is likely that the design of a shutter (risk element) will be behind schedule (due to a very complex and novel design). A typical result of traditional risk management would be an assessment rank of high. The typical mitigation plan would be to use an existing shutter design so as to keep the shutter design on schedule and avoid high risk. However, in doing so, the firm will have a camera that lacks a new and innovative shutter design (which may have been one of the primary original goals of the development program). This action, of canceling a high risk item would put the firm at risk with an inferior or dated camera design in a highly competitive marketplace that values innovation. While traditional risk management methods reduce the risk to the project it actually increases the risk to the firm.

Another weakness of traditional risk management is the definition of risk, (i.e., any delta between plan and likely result) produces risk management results that are unwarranted or incorrect. For example, if an element is unexpectedly delayed by the firm, e.g., an opportunity to license an existing novel shutter design is available, traditional risk management will identify the element as a risk to schedule and design and implement a mitigation plan. Yet, the element, while at risk for not meeting schedule, is not really a risk and mitigation is not needed. In addition, this weakness is also magnified for programs where the plan and result is difficult to measure, such as when plan is vague, by design, such as, for instance, in developmental programs where ending points are difficult to determine, where results difficult to quantify, and where incremental costs are difficult to determine.

Another weakness of traditional risk management is that it, often times, fails to identify risk to an element. For instance, in our example, the shutter component is encapsulated by a case component and therefore the case component has a longer design lead time since the subsequent design of the case must wait for the final design of the shutter. The case design is dependent on the shutter design. However, traditional risk management either fails to identify the case design as a risk or gives the case design a low risk score, in either case an incorrect risk identification.

Another weakness of traditional risk management is that it treats or rates cost, schedule and technical performance as the same priority, weight, and/or importance. For instance, in the example, assume the case item is low risk on schedule and assume that the company cannot afford any slip in schedule, even to the detriment of cost and/or technical performance. Thus, a small slip in schedule threatens the project and, in fact, the company. A typical situation for small firms seeking funding who must prove the existence of a sample product prior to its full performance. Thus, in reality, the case item should be the high risk item. Traditional risk management has no way to distinguish that schedule should be given more importance than cost and/or technical performance.

Another weakness of traditional risk management is that it has no technique for identifying, assessing or depicting magnitude and direction of risks (i.e., is the risk getting worse, is the risk getting better), where worse and better are related to need and magnitude and ultimately related to the total value of its contribution.

Another weakness of traditional risk management is that it has no way to directly consider the issue of quality. Traditionally, any issue of quality simply is consolidated into technical performance without making a distinction between technical performance and quality where quality is defined as adherence to design goals. Often, due to this consolidation of quality with other technical parameters, traditional risk management erroneously rates risk items and increases organizational risk rather than reducing it. For example: It is possible that our camera company has an impending merger which is partially dependant on the introduction of this new, low cost, light weight, high performance shutter camera. A slip in quality in any component would traditionally be rated as high risk, but a slip in quality (which is typical with a new cutting edge design) may actually be acceptable and in fact desirable in comparison to a slip in schedule or mediocre technical performance in order to obtain the benefits of the merger. Traditional risk management would simply view the case of quality as a technical performance aspect and rate it accordingly. In addition, by consolidating quality and technical performance, traditional risk management assessment of technical performance is biased by the inclusion of quality. In this example, a traditional view of good and bad are reversed, and poor quality is acceptable. Traditional risk management has no facility for accommodating these counter-intuitive requirements. This is an example of strategic goals taking priority over cost, schedule or technical measures.

Another weakness of traditional risk management is that is produces unwarranted and incorrect assessments and mitigation plans for programs that do not measure success by the traditional consequence factors of cost, schedule and technical performance. For example, projects in the pharmaceutical, high-tech software and hardware, medical, industrial and entertainment fields do not necessarily measure success by cost, schedule and technical performance.

Another weakness of traditional risk management is that it produces unwarranted and/or incorrect results at the program level. For example, a project in the early research and development stage will most likely be over cost, behind schedule, and over margin for technical performance, thereby garnering a high project risk rating. Conversely, a project in the later stages of manufacture are usually on schedule, on cost, and within margin, thereby garnering a low project risk rating. Based on these traditional ratings, the firm would cancel the program in the early stage and allow the project in a mature manufacturing stage or declining to continue. Yet, in the early stage, many programs that are high risk are actually satisfactory to the firm and do not require mitigation. Conversely, programs in the later stage that are ranked low risk will never be scrutinized and yet they may be high risk to the company, e.g., a waste of resources.

Another weakness of traditional risk management is that it produces unwarranted and/or incorrect results for programs that have a high rate of failure. For example, in the pharmaceutical industry, it takes approximately six thousand raw and developmental ideas and projects resulting in failure to create one successful result (a new accepted drug). Because the stated goal for each of these programs is to create a successful result, traditional risk management rates them all as a high risk to technical performance, cost, and schedule. Traditionally, risk management advocates that a program rated at such a high risk be cancelled, re-defined or not considered, or at the least very strictly monitored. Yet, the pharmaceutical industry must embrace these "failures" in order to achieve the one success and any overly strict monitoring would hinder the creative process and ultimately often conscript the resources and shut it down.

As the business and engineering environments become increasingly more complex and interdependent, the application of traditional risk management increases risk to a project and/or the firm. Thus, an improved risk management tool is needed.

SUMMARY OF THE INVENTION

In order to attain the objects suggested above, there is provided, according to one aspect of the present invention, a risk management procedure that modifies the application of risk management to a program to reflect a firm's strategic intent.

Another aspect of the present invention is to transfer the firm's strategic intent to the program's risk management consequence chart by adding key elements of strategic intent to the definition of success and failure contained with-in the consequence definitions.

Another aspect of the present invention is to transfer the firm's strategic intent to the program's risk management consequence chart by adding key elements of strategic intent including magnitude and urgency to the definition of success and failure contained with-in the consequence definitions.

Another aspect of the present invention is to quantify the strategic intent of the firm and then integrate the quantified value into the risk mitigation procedure.

Another aspect of the present invention is to sensitize the risk mitigation procedure to the firm's strategic intent by modifying the consequence chart to reflect the firm's strategic intent.

Another aspect of the present invention is to modify the magnitude definitions for each consequence factor by a failure component, wherein the failure component is a deduced by capturing the inverse of a programs expectations as measured against the firm's strategic intent and/or the cost of not attaining said program expectation.

Another aspect of the present invention is to incorporate program phase into risk management. The program is divided by phase and the mitigation procedure is applied to each phase of the program. Thus, additional risk metrics for a particular risk element can be procured.

Another aspect of the present invention is to identify program expectations and relate those expectations to the risk management process.

Another aspect of the present invention is to prioritize firm, program and risk management metrics, such as phase, consequence factors, likelihood versus consequence, firm strategic intent, program parameters, etc.

Another aspect of the present invention is to graphically depict program risk as a function of multiple metrics such as, for example, but not limited to, programs, firm strategic intent, risk elements, return, urgency, program phase, etc.

Another aspect of the present invention is to graphically depict: interdependencies, such as for example, but not limited to, between risk elements, programs, program parameters, strategic intent items, etc.; direction such as, but not limited to, of the firm, program, risk element, strategic intent, and/or phase, etc.; priorities such as, but not limited to, of the firm, project, strategic intent items, program parameters, risk elements, consequence factors, etc.; magnitude of metrics associated with the firm, program, strategic intent items, risk elements and/or any and all metrics in the risk management method, etc.

Another aspect of the present invention is to optimize the risk management system and method by eliminating duplicate plots, assessing trends, watching progress, eliminating sub-optimizing effects of conflicts between elements, programs, etc.

Another aspect of the present invention is the creation, identification, and depiction of risk management metrics on a chart. Risk direction, phase direction, urgency, inter-dependencies, duplicates, risk magnitude are all examples of metrics that are plotted on the chart. These additional metrics provide for trend spotting and optimization.

Another aspect of the present invention is the depiction of risk in a three dimensional view, wherein the x-axis is the risk axis (either firm risk, program risk, or program element risk), the y-axis represents phase and the z-axis represents a strategic intent metric.

Another aspect of the present invention is to consider issues of quality separate from technical performance.

Another aspect of the present invention is to farther define the delta between plan and likely result to reflect if the risk is a threat or a non-threat to the project.

Another aspect of the present invention is to further inject the needs of the parent organization or firm into the management tools of the users of the management tools, ultimately increasing performance to plan.

Another aspect of the present invention is to provide a centralized planning function for more optimized management.

Another aspect of the present invention is to increase efficiency and return in a resource constrained environment.

BRIEF DESCRIPTION OF THE DRAWINGS

The foregoing and other objects, aspects and advantages will be better understood from the following detailed description of preferred embodiments of the invention with reference to the drawings, in which:

FIG. 7 illustrates an example modifications chart;

DETAILED DESCRIPTION OF PREFERRED EMBODIMENTS OF THE INVENTION

Figure 1:
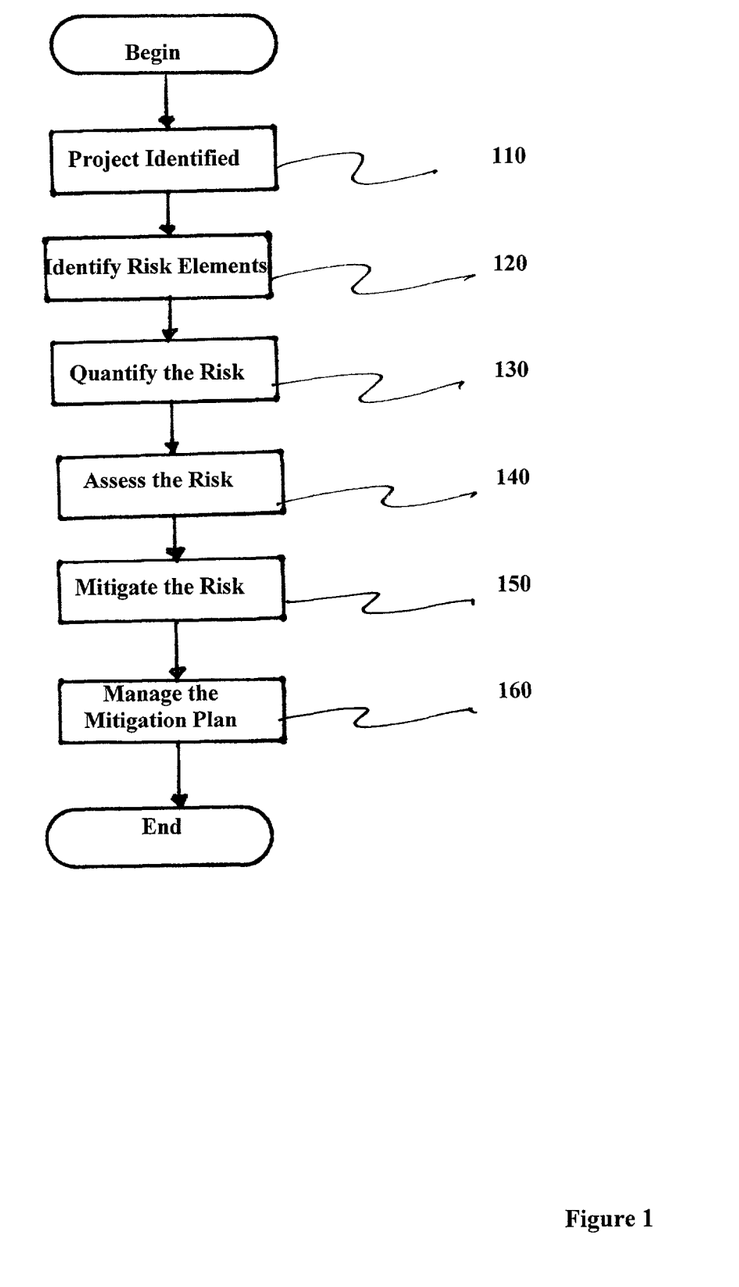
FIG. 1 illustrates a risk management technique for mitigating risk associated with a firm project.

FIG. 1 illustrates a traditional risk management technique for mitigating risk associated with a project. The first step involves identifying the project 110. The next step is to identify elements in a project that are or are potentially a problem or a risk 120. An element is a risk if there is any likelihood that the item will not perform as planned as it relates to cost, schedule, and/or technical performance. In other words, if there is a delta between the plan and what is believed will actually happen, then that element is considered a risk.

Figure 2:
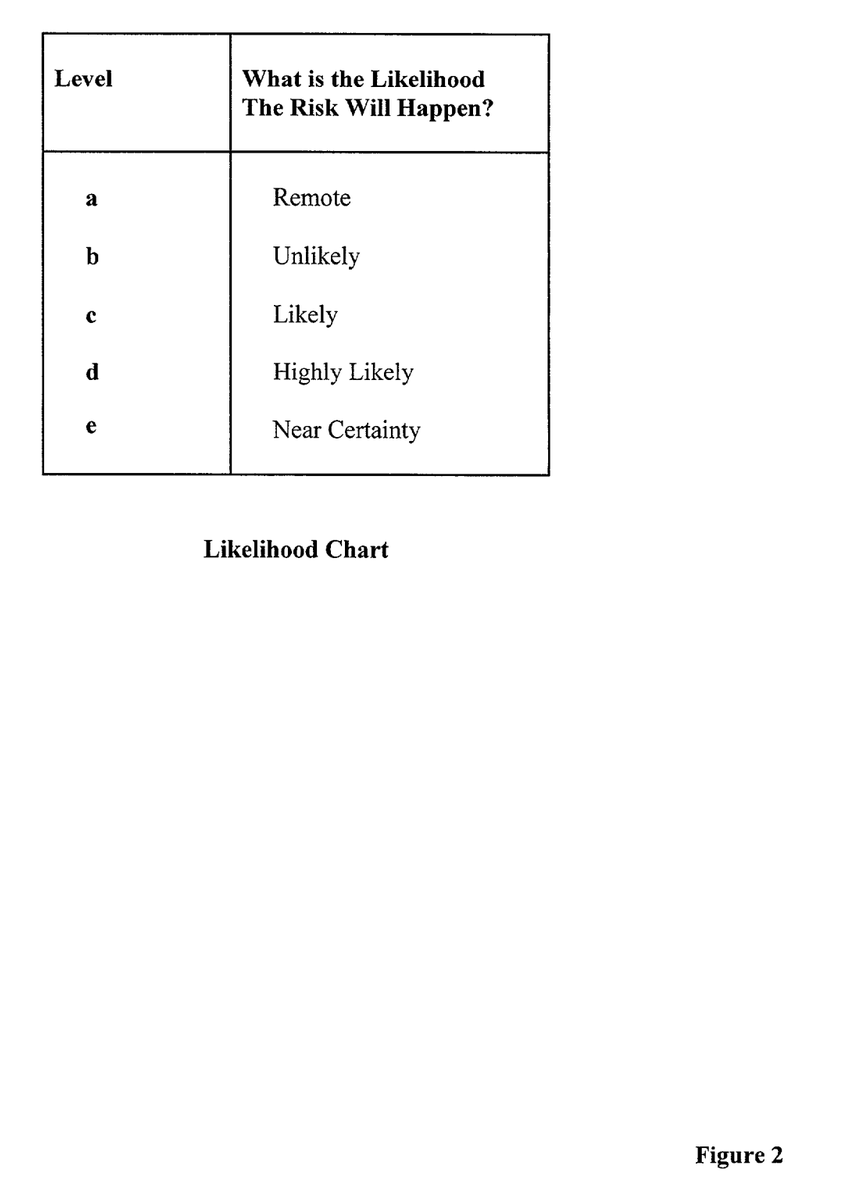
FIG. 2 illustrates a likelihood quantification chart.

Once the risk element is identified the risk is graded or quantified and a risk score is produced 130. There are two grading factors used to quantify the risk associated with the risk element. The first grading factor is likelihood, which measures, by five levels, the likelihood or probability that the risk will happen. Likelihood level one is associated with the least likelihood and likelihood level five being associated with the most likelihood. FIG. 2 illustrates a likelihood quantification chart. As illustrated in FIG. 2, the five likelihood levels are remote, unlikely, likely, highly likely, and near certainty which are quantified as level "a" through "e" respectively.

The second grading factor is consequence, which measures, by levels, the magnitude of the impact of the risk, if realized, against cost, schedule, and technical performance. Cost, schedule and technical performance are referred to as consequence factors. Each consequence factor comprises five definitions of impact which relate to magnitude of the risk, if realized. The magnitude is quantified by five levels. Consequence level one is associated with the least impact and the consequence level two is associated with the most impact. Each risk element will have three risk scores, representing combination of likelihood and consequence levels for cost, schedule and technical performance.

Figure 3:
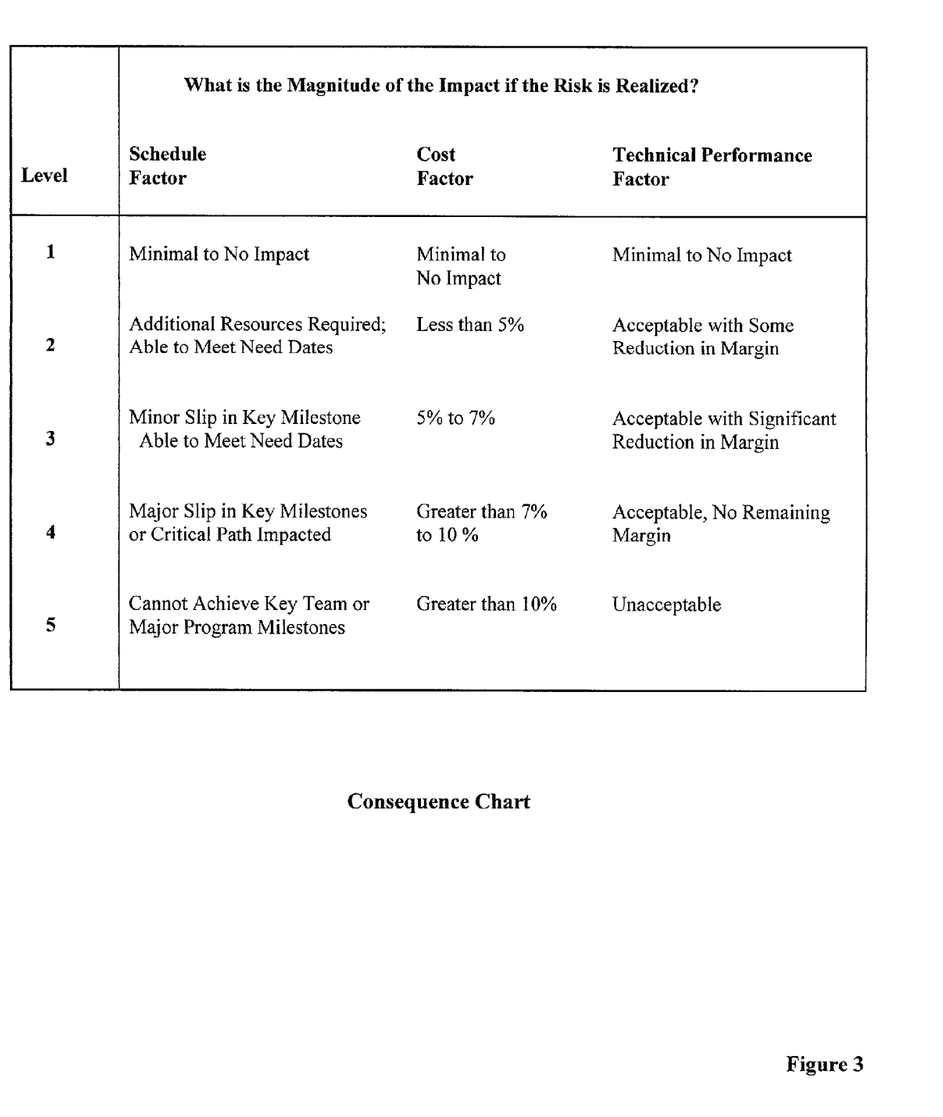
FIG. 3 illustrates a consequence chart.

FIG. 3 illustrates a consequence chart for the three consequence factors of cost, schedule, technical performance. The cost consequence for a risk element is quantified by determining, if the risk is realized, the impact to the risk element cost is: minimal to none, less than five percent, five to seven percent, more than seven percent to ten percent, and greater than ten percent; the schedule consequence for a risk element is quantified by determining, if the risk is realized, the impact to the risk element schedule is: minimal to no impact, additional resources required and/or able to meet need dates, minor slip in key milestones and/or not able to meet need dates, major slip in key milestones and/or critical path impacted, and cannot achieve key team milestones and/or cannot achieve major program milestone; the technical performance consequence for an element is quantified by determining, if the risk is realized, the impact to the risk element technical performance is: minimal to no impact, acceptable impact with some reduction in margin, acceptable impact with significant reduction in margin, acceptable impact with no remaining margin, and unacceptable impact.

Once the three risk scores are quantified, the risk element is assessed 140. Specifically, the three risk scores are transformed into either a high risk assessment value, a moderate risk assessment value, or a low risk assessment value. High risk is defined as unacceptable and represents a likely major disruption in the program. Priority management attention is required for items assessed as high risk. Moderate risk is defined as acceptable but some disruption in the program is likely. Additional management attention may be required for items assessed as moderate risk. Low risk is defined as acceptable and represents minimal to no disruption in the program. Minimal oversight is required to ensure the risk remains low for items assessed as low risk.

The transformation from a risk score to a risk assessment value a predefined procedure based on the risk score and the risk assessment guide. The risk assessment guide is an industry accepted guide that imposes a risk assessment value on the risk score. Of the three risk scores, each referred to as a driver, the driver with the highest risk assessment value, referred to as the primary driver, is selected for further risk management. The remaining drivers are discarded.

Figure 4:
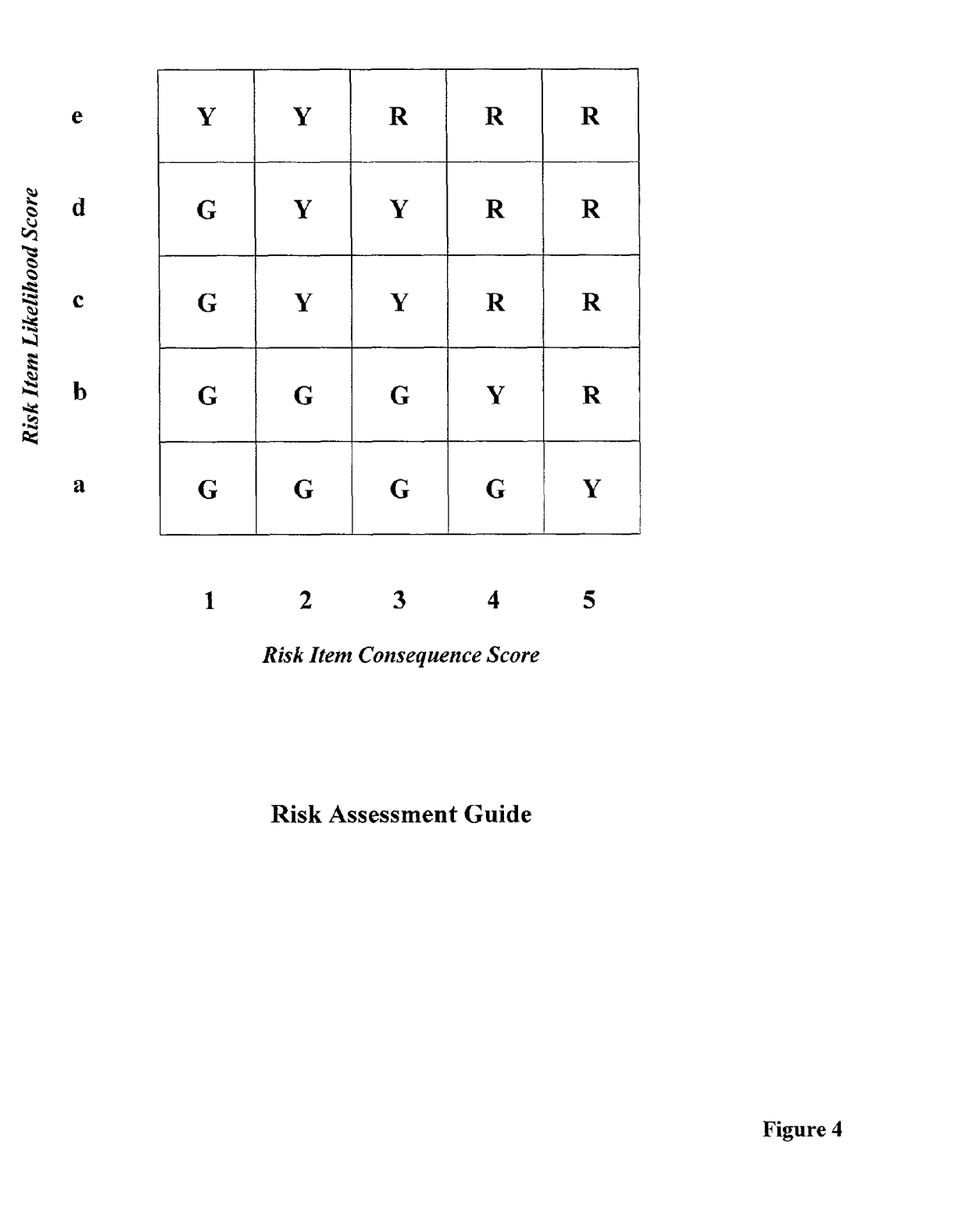
FIG. 4 illustrates a stop-light chart.

Some risk management methods utilize a visual stop-light chart to assist the transformation from risk score to risk assessment value. FIG. 4 is an illustration of a stop-light chart. Stop light chart 400 comprises a y-axis, which corresponds to likelihood levels and an x-axis, which corresponds to consequence levels. Each grid unit on the chart is predefined to correspond to either high, moderate or low risk assessment rank. In color, high corresponds to red, moderate corresponds to yellow, and low corresponds to green. In stop-light chart 400, "R" corresponds to a high risk assessment, "Y" corresponds to moderate risk assessment and "G" corresponds to low risk assessment. A high risk assessment is defined as unacceptable and represents a likely major disruption in the program. Priority management attention is required for items assessed as high risk. A moderate risk assessment is defined as acceptable but some disruption in the program is likely. Additional management attention may be required for items assessed as moderate risk. A low risk assessment is defined as acceptable and represents minimal to no disruption in the program. Minimal oversight is required to ensure the risk remains low for items assessed as low risk.

Once the risk assessment value is identified for the primary driver, a mitigation plan is developed for the associated risk element 150. Mitigation involves developing possible plans to reduce the risk as it effects cost, schedule, or technical performance, i.e., to reduce the likelihood that the risk will happen and/or to reduce the magnitude of the impact if the risk happens.

In addition, a project risk rating is determined by plotting all the project primary drivers and analyzing them en toto. The risk assessment value for the majority of primary drivers is the program risk assessment value. Projects with a high risk assessment value are often cancelled or redesigned. Other projects, those that are chosen to continue, have mitigation plans that focus on mitigating risk to the individual risk element.

After a mitigation plan is completed, the mitigation plan is managed 160. The management of the mitigation plan includes implementing the mitigation and plan and monitoring the risk items. The mitigation plan may need to be recalculated if a significant event in the project occurs or there is a change in a risk item.

Figure 5:
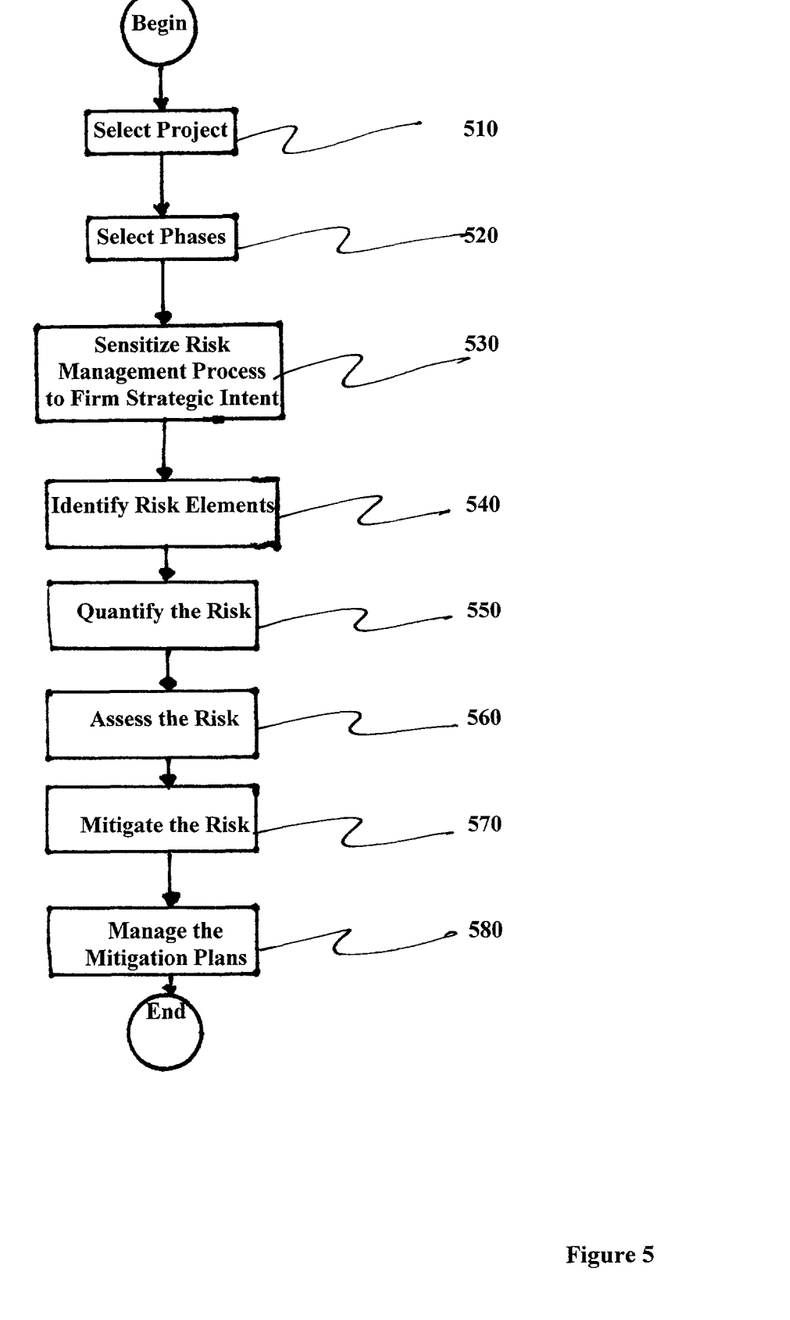
FIG. 5 illustrates a preferred embodiment of the present invention of a strategic management technique for mitigating risks associated with a firm project.

A preferred embodiment of the present invention is the risk management method illustrated in the FIG. 5 flow diagram. The first step is to identify the firm project 510. The project for instance can be, but not limited to, any program, project, process, enterprise, etc.

In an alternative embodiment of the present invention, a particular program phase is selected 520. The delineation and/or demarcation of a program provides risk assessment and risk mitigation by program phase. The determination of program phase can be influenced by, for example, but not limited to, maturity, stage, urgency, development, and/or any combination thereof. The determination of program phases can also be specific to, for example, but not limited to, a particular industry, organization, and/or product. A preferred embodiment of the present invention repeats the risk management method for each phase of a project.

An example of program phase by maturity includes, but are not limited to, the following five phases; the concept exploration phase (phase 1); the preliminary design phase (phase 2); the detailed design phase (phase 3); the construction phase (phase 4); and, the post delivery phase (phase 5). The concept exploration phase (phase 1) includes, but is not limited to, idea generation, conceptual drawings, renderings, pure research, simulations and calculations, etc. The preliminary design phase (phase 2) includes, but is not limited to, prototyping, low initial run tests, design reviews, tests, simulations and evaluations, etc. The detailed design phase (phase 3) includes, but is not limited to, drawing reviews and approvals, certifications, final designs, clinicals, 1-of manufacture or proof of concept prototype, assembly tests, etc. The construction phase (phase 4) includes, but is not limited to, final products, final assembly, reviews and tests, deliveries and set-ups, etc. The post delivery phase (phase 5) includes, but is not limited to delivery and set-up, warranties, consumer feed back, market feedback, recycling, etc.

Applying risk management by phase allows more accurate and more relevant risk assessments for each risk element or project because expectations and plans are now more realistic and directly tied to the goals of a particular program phase.

Applying risk management by phase allows risk assessment and mitigation plans to better reflect the strategic intent of a particular phase as well as the program parameters of the particular phase. In an alternative embodiment of the present invention, the delineation of phases occurs contemporaneously with determining the firm's strategic intent. In an alternative embodiment of the present invention, a project is not delineated by phase.

After the particular phase is selected, the risk management method is sensitized to the firm's strategic intent 530. To make risk assessment and risk mitigation more accurate, the present invention quantitatively and qualitatively (referred to as quantitative or quantitatively) considers the strategic intent, objectives or goals of a firm. The term quantitative or quantitatively includes, for example, but not limited to, any goal, objective, metrics, theory, parameter, constraint, etc. of the firm. Strategic intent includes for example, but not limited to, strategy, business, environmental, cost, schedule, technical, financial, tactical, partnership, merger, interest rates, taxes, profits, expected return rates, protection from mergers, protection from predatory practices, preparation for liquidation or sale, preparation for licensing, political, regulatory, and/or geographical issues. The intentional, quantitative and qualitative incorporation of strategic intent reduces the chance that a risk assessment or mitigation plan is counterintuitive, unwarranted, opposite, and/or simply not in support of a firm's strategic intent. Similarly, the incorporation of strategic intent can be used by a firm to ensure that a projects is, at all levels and in all phases, in support of the firm's strategic intent. In an alternative embodiment of the present invention, the incorporation of strategic intent items is applicable when limited resources must be parsed, such as for example, but not limited to funding and/or manpower.

A preferred embodiment of the present invention sensitizes the project to the firm strategic intent by altering the traditional consequence chart to reflect firm strategic intent items. A preferred embodiment of the present invention, as illustrated in the FIG. 6 flow diagram and discussed herein, sensitizes the project to the firm strategic intent by altering the traditional consequence chart to reflect firm strategic intent items.

In an alternative embodiment of the present invention, strategic intent can be quantitatively and qualitatively introduced anywhere within the traditional risk management method, such as for example, but not limited to, the quantifying step, the assessing risk step, the mitigating step, the managing step and/or any combination thereof.

In an alternative embodiment of the present invention, a project or project elements are assigned a strategic element or marker to which they contribute, and then managed irrespective of phase.

Once the strategic intent of the firm has been incorporated into the consequence chart, individual risk elements are identified 540. A project element is a risk if there is any likelihood that the item will not perform as planned as it relates to cost, schedule, and/or technical performance. In other words, if there is a delta between the desired plan and what is believed will actually happen, then that element is considered a risk.

In an alternative embodiment of the present invention, the definition of project risk elements is the added determination of whether the preliminary risk element is a threat or a non-threat. Non-threatening elements that otherwise are identified as a risk element are weeded out of the analysis.

After the individual elements are identified, the risk is graded or quantified and a risk score is produced 550. There are two grading factors used to quantify the risk associated with the risk element. The first grading factor is likelihood, which measures, by five levels, the likelihood or probability that the risk will happen. Likelihood level one is associated with the least likelihood and likelihood level five being associated with the most likelihood. FIG. 2 illustrates a likelihood quantification chart. As illustrated in FIG. 2, the five most typical likelihood levels are remote, unlikely, likely, highly likely, and near certainty which are quantified as level "a" through "e" respectively.

The second grading factor is consequence, which measures, by levels, the magnitude of the impact of the risk, if realized, against cost, schedule, and technical performance. Cost, schedule and technical performance are referred to as consequence factors. A typical consequence factor chart comprises five definitions of impact which relate to magnitude of the risk, if realized. However, other consequence charts may comprise three or seven or some other definitions of impact. In an alternative embodiment more than two grading factors may be used, including but not limited to likelihood, consequence, urgency, priority, danger, etc.

The magnitude is typically quantified by five levels. Consequence level one is associated with the least impact and the consequence level five is associated with the most impact. Each risk element will have three risk scores, representing combination of likelihood and consequence levels for cost, schedule and technical performance. In an alternative embodiment of the present invention, risk scores are produced for each risk element by phase. Thus, for example, a risk element identified in the preliminary design phase may be either completely mitigated by the time it is in the next phase, the final design phase, or if not, it is re-rated in the next phase using the definitions of success and failure (consequence) for that phase. This represents a continuous lifecycle view of risk management.

Figure 6:
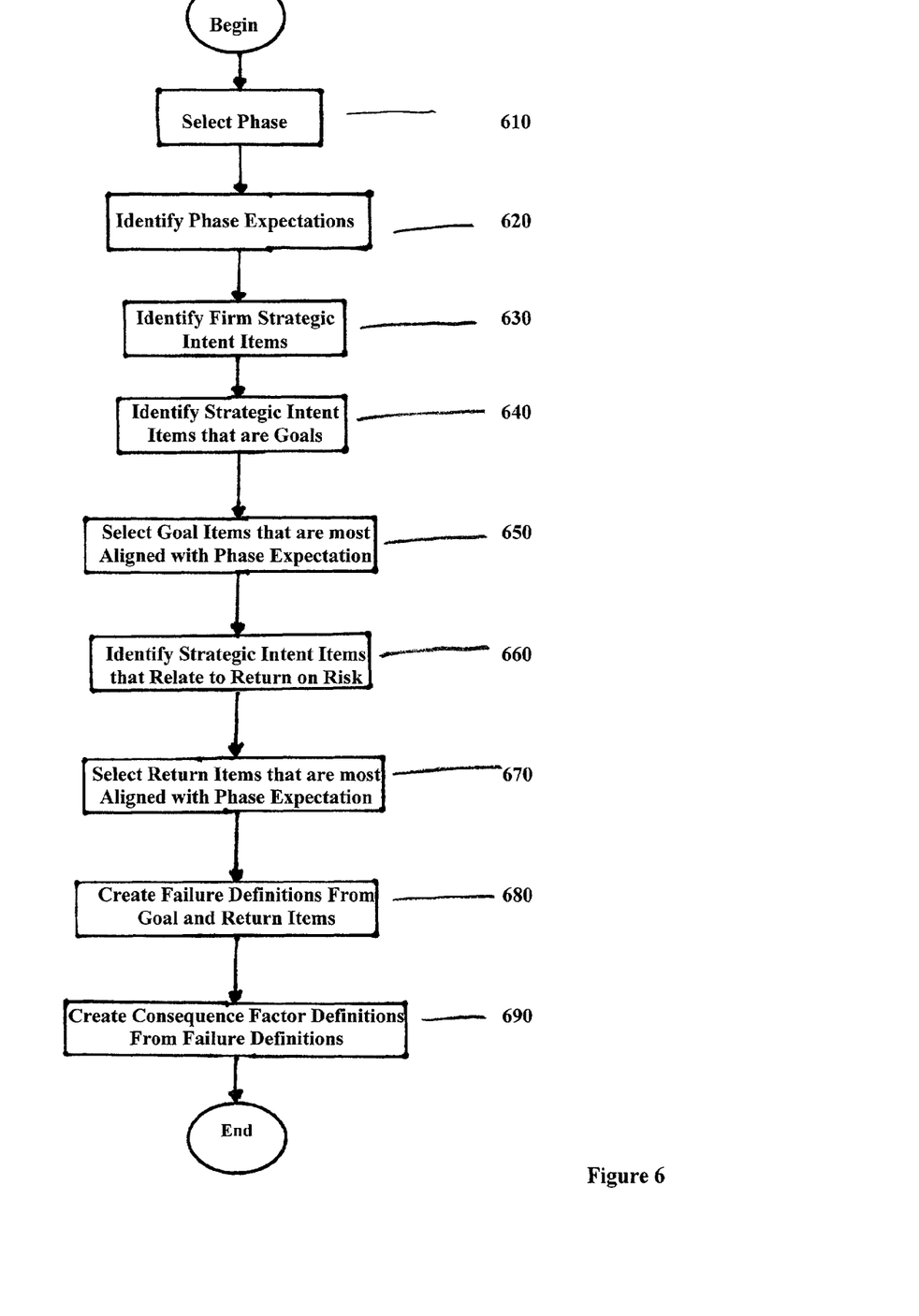
FIG. 6 illustrates a preferred embodiment of the present invention to sensitize a firm project to firm strategic intent.

The preferred embodiment of the present invention uses a modified consequence chart that reflects firm strategic intent items. FIG. 6 illustrates and the discussion therein describes a preferred embodiment of the present invention as to how to create the modified consequence chart.

Once the consequence factors are quantified, i.e., to reflect phase strategic intent, and priority weight, the risk element is assessed 560. Specifically, the risk element's three risk scores, per phase if applicable, are transformed into either a high risk assessment value, a moderate risk assessment value, or a low risk assessment value. High risk is defined as unacceptable and represents a likely major disruption in the program. Priority management attention is required for items assessed as high risk. Moderate risk is defined as acceptable but some disruption in the program is likely. Additional management attention may be required for items assessed as moderate risk. Low risk is defined as acceptable and represents minimal to no disruption in the program. Minimal oversight is required to ensure the risk remains low for items assessed as low risk.

The transformation from a risk score to a risk assessment value is a predefined procedure based on the risk score and the risk assessment guide. The risk assessment guide is an industry accepted guide that imposes a risk assessment value on the risk score. Of the three risk scores, each referred to as a driver, the driver with the highest risk assessment value, referred to as the primary driver, is selected for further risk management. The remaining drivers are tracked and considered with less focus as needed. In an alternative embodiment of the present invention, a risk element will have a primary driver for each phase. In an alternative embodiment, the risk scores may be combined into an composite score, with- or with-out strategic weighting factors.

Some risk management methods utilize a visual stop-light chart to assist the transformation from risk score to risk assessment value. FIG. 4 is an illustration of a stop-light chart. Stop light chart 400 comprises a y-axis, which corresponds to likelihood levels and an x-axis, which corresponds to consequence levels. Each grid unit on the chart is predefined to correspond to either high, moderate or low risk assessment rank. In color, high corresponds to red, moderate corresponds to yellow, and low corresponds to green. In stop-light chart 400, "R" corresponds to a high risk assessment, "Y" corresponds to moderate risk assessment and "G" corresponds to low risk assessment. A high risk assessment is defined as unacceptable and represents a likely major disruption in the program. Priority management attention is required for items assessed as high risk. A moderate risk assessment is defined as acceptable but some disruption in the program is likely. Additional management attention may be required for items assessed as moderate risk. A low risk assessment is defined as acceptable and represents minimal to no disruption in the program. Minimal oversight is required to ensure the risk remains low for items assessed as low risk.

In an alternative embodiment of the present invention, risk elements that comprise dependencies are linked. Thus, a risk element that is high risk may be linked to a risk element that is low risk. For example, a component that is a high risk schedule element is linked to all components that are time dependent on the component. In an alternative embodiment, the linking is done visually on, for example, but not limited to, a stop-light chart.

In an alternative embodiment of the present invention, the magnitude or weight of the risk associated with the elements is quantified and visually plotted. The weight can be in relative to, for example, but not limited to, other project risk elements or contribution to a firms strategic intent item, or total expected value of that item/project or any combination thereof. In an alternative embodiment, the weighting is done visually on, for example, but not limited to, a stop-light chart by the use of, for example, but not limited to weighted icons, plots, lines and/or vectors.

In an alternative embodiment of the present invention, the direction of a risk element is quantified and visually plotted. The direction is a function of, for example, but not limited to, a firm strategic intent item, phase, etc. For example, in a program with four phases, the risk score plot can show the direction of the risk as a function of those four phases. In a preferred embodiment of the present invention, direction is plotted by the use of arrows.

In an alternative embodiment of the present invention, the direction of a risk element is quantified and visually plotted using multiple embedded arrows or icons, with one arrow or icon depicting the expected risk level of the item as it progresses through the phases, and another arrow or icon depicting the desired risk state of the item as it progresses through the phases. In summary, one marker would depict current direction, one desired. Other metrics and measures could also be represented by the arrows or icons, including value, importance, etc.

In an alternative embodiment of the present invention, risk scores can be plotted with a third dimension or axis, referred to as the z-axis. In a preferred embodiment of the present invention, the z-axis represents phase. Thus, in a four phase program, the risk element's primary drivers, (one for each phase) can be plotted on the same chart. In an alternative embodiment of the present invention, the z-axis represents, for example, a particular strategic intent item, such as expected returns, quantity, value, multiple related projects, phase, etc.

In a preferred embodiment of the present invention, once all the primary drivers are plotted via traditional stop-light charts and/or three dimensional charts, the risk assessment is evaluated and optimized. For example, duplicate risk assessment values are combined or eliminated, co-dependant risk assessment values are grouped; risk assessment values can be prioritized by weight, direction, phase, strategic intent, consequence factor. Optimization allows for risk trends to be identified. For example, it may be discovered that an inordinate amount of risk is associated with a particular strategic intent item. Thus, the firm may decide to reevaluate the relative priority of that item. Thus, in an alternative embodiment of the present invention, risk management identifies problems with the firms business factors. In another example, it is discovered that an inordinate amount of risk is associated with a particular project. The firm can reevaluate the projects merits as it endangers the rest of the firm's activities.

In an alternative embodiment of the present invention, secondary and tertiary drivers are plotted and assessed. In an alternative embodiment of the present invention, a project risk rating is determined from the project risk assessment values. The risk assessment value for the majority of risk assessment values is the project risk assessment value.

Once the risk assessment values are identified for the primary driver (and, in some cases, optimized) a mitigation plan is developed for the associated risk element 570. Mitigation involves developing possible plans to reduce the risk as it effects cost, schedule, or technical performance, i.e., to reduce the likelihood that the risk will happen and/or to reduce the magnitude of the impact if the risk happens. In a preferred embodiment of the present invention, mitigation plans now include direct and indirect links to strategic intent and develop possible plans to mitigate risk elements with high risk assessment values, i.e., moving high to medium and/or low and/or medium to low.

After a mitigation plan is completed, the mitigation plan is managed 580. The management of the mitigation plan includes implementing the mitigation and plan and monitoring the risk items. The mitigation plan may need to be recalculated if a significant event in the project occurs or there is a change in a risk item. A typical mitigation step may be to add resources, re-train personnel, look for an alternate vendor, etc.

In an alternative embodiment of the present invention, the risk management system is repeated at set intervals or whenever a predefined event occurs, such as, but not limited to, a modification of strategic intent or program parameters, an unexpected events occur or an individual risk assessment value has been successfully mitigated and/or the movement from one phase to another, etc.

In a preferred embodiment of the present invention, a firm's risk management program is sensitized to the firm's strategic intent by modifying the definitions of the consequence factors. FIG. 6 illustrates a preferred embodiment of the present invention to create modified consequence factor definitions. Success must be first defined to enable the definition of failure which is then used to develop the consequences of a potential failure. This is a summary of the process found in FIG. 600.

The first step comprises selecting a program phase 610. In a preferred embodiment of the present invention, a program is divided into multiple phases and modified consequence definitions are created by phase. After a phase is selected, the expectations of the phase are identified 620. The expected and desired return of each phase is identified. The expected and desired return of each phase is necessarily different due to the inherent nature of the phase. In other words, the phases are distinct by definition and thus, the expectations or returns for each phase are different. In an alternative embodiment of the present invention, the program is not divided by phase and expectations are those of the project, in general.

After the phase is selected and the respective phase expectations are identified, firm strategic intent is identified 630. A preferred embodiment of the present invention identifies firm strategic intent as the decomposition of the firm's vision and mission statements.

Once strategic intent is identified, the items that are goals are identified 640. Goals items are those strategic intent items that are goals of the firm. The strategic intent goals that most logically support the phase expectation are selected next 650.

Similarly, once strategic intent is identified, the items that represent a return on risk are identified 660. Return on risk items are those strategic intent items that will or should create a return on or for the risk taken. The strategic intent return on risk items that most logically support the phase expectation are selected next 670.

Next, failure definitions are created from the goal and return on risk strategic intent items 680. For every risk there is an implied reward or logical return. The failure definition is defined as capturing the inverse of the implied reward (i.e., the program or phase expectation) or the cost of not attaining the reward or goals, (i.e., the program or phase expectation).

After the failure definitions are defined, the consequence factor definitions are created 690. The failure definition is distilled by cost, schedule and technical performance and then summarized to form the consequence definition. Specifically, words in the failure definition that related to cost, schedule and/or technical performance are identified and then summarized. The resulting summary is parsed by magnitude level. There are five traditional magnitude levels, though some risk management programs comprise three and seven magnitude levels. The magnitude levels correspond to the consequence chart and represent the magnitude of the impact of the risk on the strategic intent goal and return on risk item. In an alternative embodiment, if no words in the failure definition are identified, then the implied desires of the strategic intent goals and return on risk items are used. A modified consequence chart is crafted for each phase. In an alternative embodiment of the present invention, a single modification definition table representing an amalgamation of all phases is provided when a project is not divided by phases.

FIG. 7 illustrates an example consequence modification definition table which visually charts the steps illustrated in FIG. 6 for the preliminary design phase for the Acme Camera Company example. The Acme Camera Company project is to manufacture a camera. Project phases are divided by project maturity and four phases are identified, with each having a desired expected return. Phase 1 is concept exploration, phase 2 is preliminary design, phase 3 is final or detailed design, and phase 4 is construction and delivery, Next, the Acme Camera Company's strategic intent is identified. The Acme firm vision statement states: "to be world leader in camera shutter technology in five years" and the mission statement states: "to maintain a profitable, mid range quality and mid to high range technology reputation in the camera business." The strategic intent items, for example, are determined to be: value innovation more than quality or financial performance, value cash flow while preserving investment in research and development.

The goals and return on risk strategic intent items for Acme are identified from these and are summarized under goal column and return on risk column, by phase. Specifically, what is the risk for failing to satisfy the phase expectation as it relates to goals and return on risk.

Next, a failure definition is created for each phase. The failure definition is the inverse of the goal and return on risk summary and is shown by phase under the failure definition column in FIG. 7. Finally, the modification components that will added to the consequence factor definitions are created from the failure definition. The modification component is based on the phase and is parsed by the number of magnitude levels and by the three consequence factors of cost, schedule and technical performance.

Figure 8:
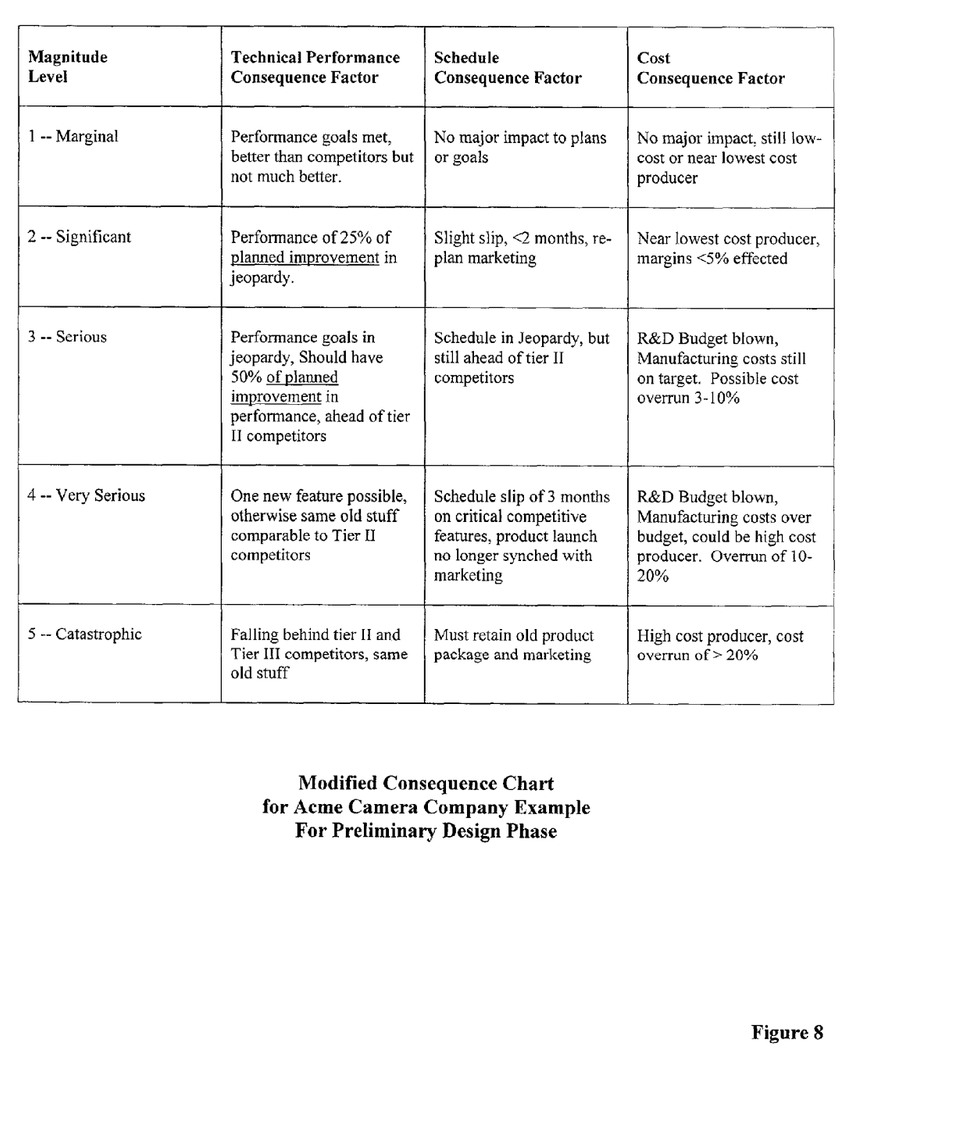
FIG. 8 illustrates an example modified consequence chart.

FIG. 8 illustrates an example of a modified consequence chart, using the Acme Camera Company example. The modified consequence chart comprises three consequence factors, cost, schedule, and technical performance and comprises five magnitude levels, which represent the magnitude of the impact, if realized, on project cost, schedule, and/or technical performance for the particular phase. In the Acme example, the modified consequence chart is for the preliminary design phase, i.e., phase 2. In a preferred embodiment of the present invention, modified consequence charts are created for each phase.

In an alternative embodiment of the preferred invention, a consequence chart comprises an additional consequence factor is provided. The additional consequence factor is defined as the strategic intent item and/or a weight used for multiplying risk composite scores to yield magnitude or expected values.

In an alternative embodiment of the present invention, the issue of firm, project, phase, or program element quality is incorporated into the program risk management method by defining quality as a strategic intent metric or a program or phase expectation.

Figure 9:
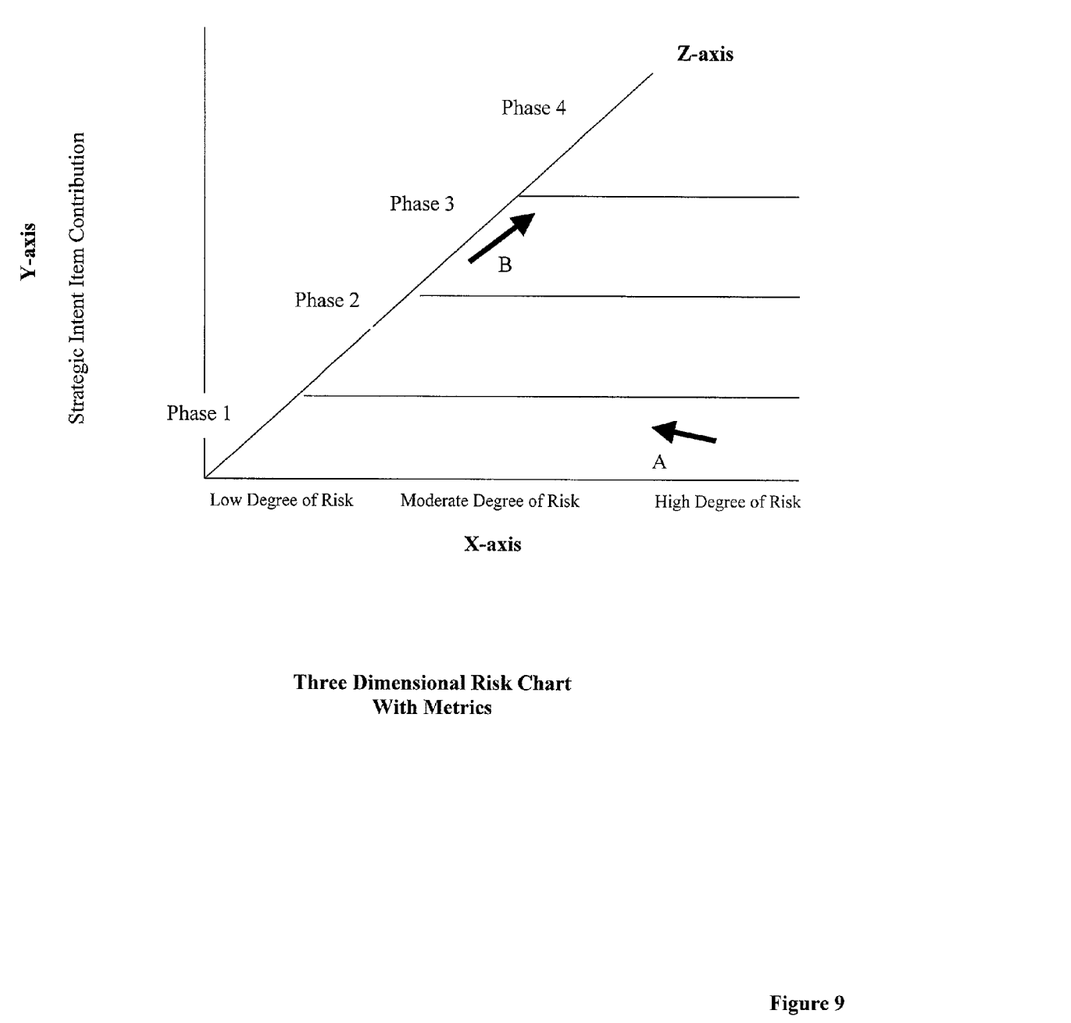
FIG. 9 illustrates a preferred embodiment of the present invention of a three dimensional risk chart.

An alternative embodiment of the present invention provides a three dimensional chart for risk presentation and/or evaluation. FIG. 9 illustrates a three dimensional risk chart wherein the x-axis corresponds to risk score, composite or individual, the y-axis corresponds to firm strategic intent item, which could be any aggregate measure of performance or goals, such as, but not limited to, profit, expected value, innovative quotient, number of students educated, number of cars through a new toll system, etc., and the z-axis corresponds to program phase. Each risk item or group of risk items is displayed on the chart and is identified by an icon, such as, but not limited to, an arrow and a corresponding letter, wherein the letter represents the risk element.

In an alternative embodiment of the present invention, the x-axis represents other relevant management metrics, such as, for example, but not limited to, timing, urgency, volume, size, etc. In an alternative embodiment of the present invention, the z-axis represents other relevant management metrics, such as, for example, but not limited to, timing, urgency, volume, size, etc.

In an alternative embodiment of the present invention, the y-axis represents other relevant management metric, such as, for example, but not limited to, component status in comparison to the average in the industry or with a key competitor, projected profits, etc.

In a preferred embodiment of the present invention, the y-axis represents key firm strategic metric, such as for example, but not limited to projected profit, rate of return, budget size, resource allocation, department assigned, etc.

In an alternative embodiment of the present invention a two dimensional chart is used to depict and manage risk elements. The axis chosen may be risk and return, risk and phase, and the like. In an alternative embodiment, risk may be left off either axis, and, instead by represented by color codes used on the project item identifiers, there-by leaving the remaining two axis available for other management and performance metrics.

In a preferred embodiment of the present invention, the length of the arrow may represent the magnitude of the risk item or the magnitude of the impact or potential impact of the risk element or the risk element has on the project or the firm. The magnitude can be measured against other displayed magnitudes or against a pre-defined standard.

In a preferred embodiment of the present invention, the pointing direction of the arrow represents the direction of the risk element as it relates to that items progress against particular strategic intent item. The direction determines if the risk element is moving in the desired direction of maturity or risk).

In an alternative embodiment of the present invention, the direction of a risk element is quantified and visually plotted using multiple embedded arrows or icons, with one arrow or icon depicting the expected risk level of the item as it progresses through the phases, and another arrow or icon depicting the desired risk state of the item as it progresses through the phases. One marker can depict direction. In another alternative embodiment of the present invention, other metrics and measures are represented by the arrows or icons, including value, importance, etc.

In a preferred embodiment of the present invention, the color of the arrow represents a firm or project metric, such as for example, but not limited to, dependencies, project affiliation, risk level, etc. In a non-color environment, this metric can be distinguished using the gray scale or black and white patterns.

In a preferred embodiment of the present invention, the arrow width represents a firm or project metric, such as for example, but not limited to, urgency, project affiliation, magnitude, etc.

In an alternative embodiment of the present invention, project risk is represented on an axis, thereby providing risk evaluation, optimization and mitigation from a program level.

In an alternative embodiment of the present invention, the same risk item is can be plotted for each phase. Any deviation from an x-y axis vertical plot, indicates that the firm strategic intent item(s) are affecting the risk assessment by different degrees for each phase.

Six risk elements are plotted on the three dimensional graph illustrated in FIG. 9. The z-axis is phase, the x-axis is risk, and the y-axis is strategic intent item. The z-axis represents the amount of contribution a particular element is making in furtherance of the strategic intent item.

In a preferred embodiment, the element plots utilize direction, weight, tail size for evaluation purposes. The three dimensional risk chart comprises elements A and B. Each element comprises a letter and corresponding arrow. For example, element A, as plotted in FIG. 9 is high risk (from the x-axis), in the first phase of the program (from the z-axis), has no contribution to the strategic intent item (from the y-axis).

For example, if the y-axis represented profit, the expectation would be that the y-axis would be low in the first phase since profit is not usually contributed by the first phase of a program. However, if the project was licensing, then there would be an expected profit result in phase 1. In addition, the element is pointing up, so it is making progress to the next phase. However, the slope of element A is low and thus, element A will make it to Phase 2 somewhat slowly. Finally, the arrow is pointing towards less risk, representing a trend to move to less risk. In an alternative embodiment of the present invention, two arrows are used to represent a risk element, wherein the first arrow represents potential and actual phase movement and the second arrow represents potential and actual risk movement. The weight of the arrow is heavier than most of the other arrows, representing a greater urgency. The length of the arrow represents the magnitude of the risk. The length of the arrow represents the magnitude of the risk and is on the larger side as compared to other arrows.

In another example, element B, as plotted in FIG. 9 is moderate risk (from the x-axis), in the third phase of the program (from the z-axis), has higher than average contribution to the strategic intent item (from the y axis). In addition, the arrow is pointing up to the right representing strong movement to the next phase but also strong movement to higher risk. The weight of the arrow is heavier than most of the other arrows, representing a greater urgency. The length of the arrow represents the magnitude of the risk and is on the larger side as compared to other arrows.

Figure 10:
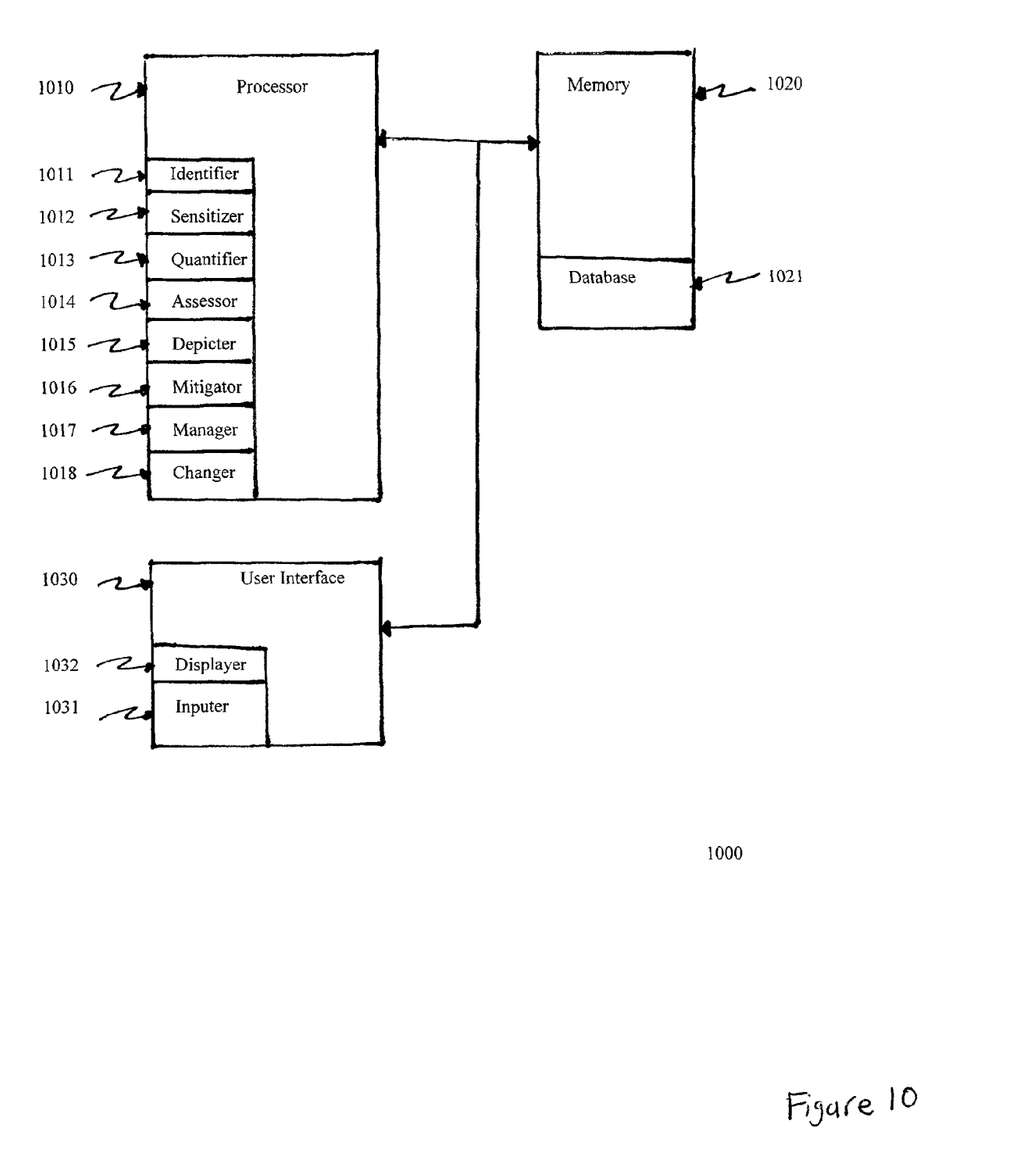
FIG. 10 illustrates a preferred embodiment of the present invention of a system level diagram of a preferred embodiment of the present invention.

FIG. 10 illustrates a system capable of implementing the present invention. System 1000 comprises processor 1010, memory 1020, and user interface 1030. Processor 1010, memory 1020 and user interface 1030 are electrically connected, which includes but is not limited to wireless connection and/or Internet connection. Processor 1010 comprises an identifier 1011 to identify firm projects, firm strategic intent, project parameters, and/or project phases, a sensitizer 1012 to transfer firm strategic intent to the firm project, a quantifier 1013 to quantify the risk associated with the risk element, an assessor 1014 to assess, evaluate and/or optimize the quantified risk; a depicter 1015 to depict the two dimensional and three dimensional risk assessment, evaluation, and/or optimization charts, a mitigator 1016 to develop possible mitigation plans for the assessed risk, a manager 1017 to manage the mitigation plan; and a changer 1018 to change said consequence chart to comprise said strategic intent items.

User interface 1030 comprises an inputer 1031 for monitoring and directing and/or controlling processor 1010, and a displayer 1032 for displaying processor prompts and results. User interface 1030 may include artificial intelligence or simple input queries to obtain risk management input to predefined questions. Memory 1020 comprises database 1021 for storing data utilized by the processor and the user interface.

While the invention has been described in terms of preferred embodiments, those skilled in the art will recognize that the invention can be practiced with modification within the spirit and scope of the appended claims.

What is claimed is:

1. A method for mitigating risk to a program of a firm, said method comprising:
   identifying, by an identifier, strategic intent items of said firm;
   changing, by a changer, a consequence chart to comprise said strategic intent items;
   identifying, by the identifier, expectations of said program;
   selecting, by a manager, strategic intent items that correlate to said program expectations, thereby creating correlating strategic intent items;
   integrating, by an assessor, said program expectations with said correlating strategic intent items to create a first failure definition;
   redefining, by the changer, said consequence chart to comprise said first failure definition wherein said program is divided into phases;
   identifying, by the identifier, expectations of each said program phase;
   selecting, by the manager, strategic intent items that correlate to each said program phase expectations, thereby creating correlating phase strategic intent items;
   integrating, by the assessor, each said program phase expectations with said correlating phase strategic intent items to create a second failure definition; and
   redefining, by the changer, said consequence chart to comprise said second failure definition
   wherein said failure definition comprises an inverse of said expectations.

* * * * *